United States Patent
Pachciarz et al.

(10) Patent No.: US 6,338,420 B1
(45) Date of Patent: Jan. 15, 2002

(54) MOTOR VEHICLE FUEL TANK AND METHOD

(75) Inventors: Mahlon Richard Pachciarz, Grand Blanc; Gary Francis Stack, Fenton; Carlos A. Gutierrez, Grand Blanc, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/533,333

(22) Filed: Mar. 23, 2000

Related U.S. Application Data

(60) Provisional application No. 60/138,036, filed on Jun. 8, 1999.

(51) Int. Cl.[7] .................................................. B65D 1/42
(52) U.S. Cl. ....................... 220/562; 220/4.14; 220/4.13
(58) Field of Search ................................ 220/4.14, 564, 220/562, 4.13

(56) References Cited

U.S. PATENT DOCUMENTS

| | | | | | |
|---|---|---|---|---|---|
| 2,611,512 | A | * | 9/1952 | Fashay ......................... | 220/562 |
| 3,912,107 | A | * | 10/1975 | Baumann .................... | 220/4.14 |
| 4,211,208 | A | * | 7/1980 | Lindner ....................... | 126/400 |
| 4,231,482 | A | * | 11/1980 | Rogan | |
| 4,399,850 | A | * | 8/1983 | Schiemann .................... | 150/5 |
| 4,526,286 | A | * | 7/1985 | Jung et al. .................. | 220/4.14 |
| 6,135,306 | A | * | 10/2000 | Clayton et al. ............. | 220/562 |
| 6,138,859 | A | * | 10/2000 | Aulph et al. ................ | 220/4.14 |

FOREIGN PATENT DOCUMENTS

| | | | | |
|---|---|---|---|---|
| EP | 0 064 310 | * | 11/1982 | ................. 220/4.14 |

* cited by examiner

*Primary Examiner*—Joseph M. Moy
(74) *Attorney, Agent, or Firm*—Vincent A. Cichosz

(57) ABSTRACT

A plastic fuel tank including a hollow plastic tank body and a variable length plastic strut in the hollow tank body. A pair of flat plastic sheets are vacuum formed at a forming temperature in upper and lower mold cavities to the shape of upper and lower plastic shells. The plastic strut includes an upper foot, a lower foot, and a coupling means operable to support the upper foot on the lower foot for back and forth linear translation against a controlled resistance. With the mold cavities separated, the plastic strut is interposed between the upper and lower shells. The mold cavities are closed to form the hollow tank body by fusion bonding the upper and lower shells at respective attachment flanges on each. When the tank body thereafter cures and shrinks, the plastic strut is squeezed between the upper and lower shells against the controlled resistance of the coupling means to fusion bond the upper and lower feet of the strut to the shells. The strut expands and collapses during pressure and vacuum cycles in the tank body. The coupling means limits linear collapse and expansion of the strut to prevent excessive collapse and expansion of the tank body.

6 Claims, 2 Drawing Sheets

MOTOR VEHICLE FUEL TANK AND METHOD

RELATED PATENT APPLICATION

This application claims the benefit of U.S. Provisional Patent Application No. 60/138036, filed Jun. 8, 1999.

TECHNICAL FIELD

This invention relates to a motor vehicle fuel tank and method of making a motor vehicle fuel tank.

BACKGROUND OF THE INVENTION

Plastic fuel tanks for motor vehicles are typically manufactured by processes identified as "blow molding" and "twin sheet thermoforming". In the blow molding process, a mass of liquid plastic at elevated temperature is expanded in a mold by injecting gas under pressure into the plastic mass. In the twin sheet thermoforming process, a pair of flat plastic sheets are vacuum formed in mold cavities at an elevated forming temperature to the shape of upper and lower shells each having an attachment flange around an open end thereof. When the mold cavities are closed, the attachment flanges are squeezed together to fusion bond the shells and thereby form a hollow plastic tank body. Plastic fuel tanks manufactured by both processes are subject to pressure and vacuum cycles attributable to differences between atmospheric pressure around the tank body and the pressure of a gaseous mixture of air and fuel vapor in the tank body. In a pressure cycle, gas pressure in the tank body exceeds atmospheric pressure and the top of the tank body expands away from the bottom of the tank body. In a vacuum cycle, atmospheric pressure exceeds the gas pressure in the tank body and the top of the tank body collapses toward the bottom of the tank body. To reinforce a blow molded plastic tank fuel tank against such pressure and vacuum cycles, it is known to install rigid structural supports through an access port in the top of the tank body. Such rigid supports may not be adequate, however, because of their location only in the immediate vicinity of the access port. To reinforce a twin sheet thermoformed plastic fuel tank, it is known to interpose a rigid structural support between the vacuum formed shells before the mold cavities are closed so that after the attachment flanges are fusion bonded, shrinkage during curing of the tank body fusion bonds the ends of the structural support to the top and bottom of the tank body. Such rigid structural supports, however, may compromise the integrity of the tank body by piercing the top and/or bottom thereof as the tank body shrinks.

SUMMARY OF THE INVENTION

This invention is a new and improved twin sheet thermoformed plastic fuel tank including a hollow plastic tank body and a variable length plastic strut in the hollow tank body. A pair of flat plastic sheets are vacuum formed at an elevated forming temperature in upper and lower mold cavities of a molding apparatus to the shape of upper and lower plastic shells. The plastic strut includes an upper foot, a lower foot, and a coupling means operable to support the upper foot on the lower foot for back and forth linear translation in the direction of a longitudinal centerline of the strut against a controlled resistance. With the mold cavities separated, the plastic strut is interposed between the upper and lower shells. Then, the mold cavities are closed together to form the hollow tank body by fusion bonding the upper and lower shells at respective attachment flanges on each. When the tank body thereafter cures and shrinks, the plastic strut is squeezed between the upper and lower shells against the controlled resistance of the coupling means to fusion bond the upper and lower feet of the strut to the shells. The strut then expands and collapses with the hollow tank body during pressure and vacuum cycles therein The coupling means also limits linear collapse and expansion of the strut to prevent collapse and expansion of the tank body which could negatively affect the structural integrity thereof. In a first embodiment of the plastic fuel tank according to this invention, a resilient flexible lobe of the plastic strut constitutes the coupling means. In a second embodiment of the plastic fuel tank according to this invention, a pilot on an upper shank portion of the strut, a guide on a lower shank portion of the strut for the pilot, and end stops on the upper and lower shank portions constitute the coupling means.

DESCRIPTION OF THE PREFERRED EMBODIMENT

Figure 1:
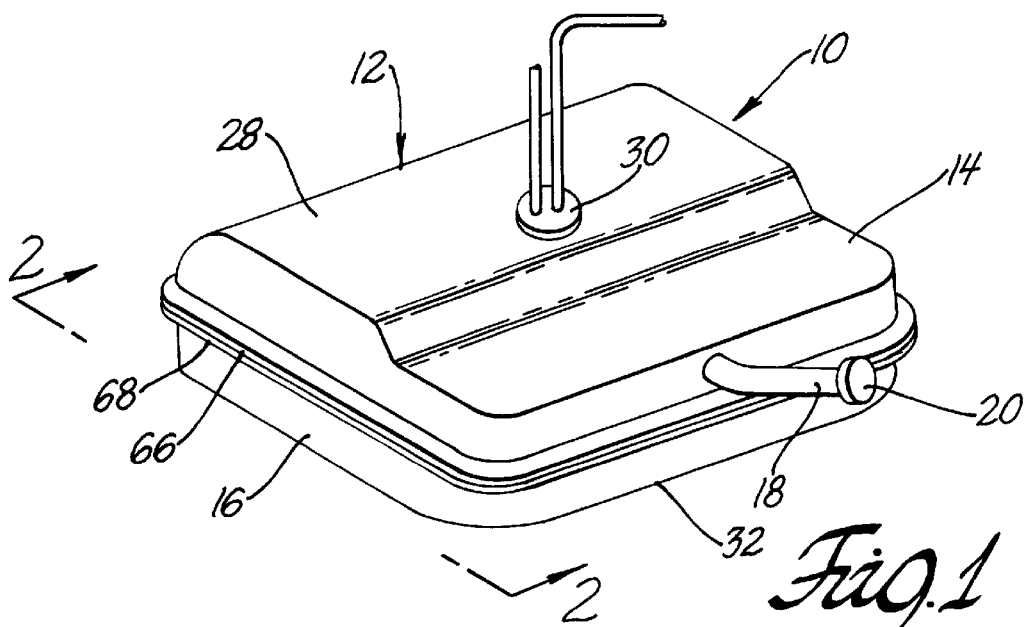
FIG. 1 is a perspective view of a plastic motor vehicle fuel tank according to this invention.
Figure 2:
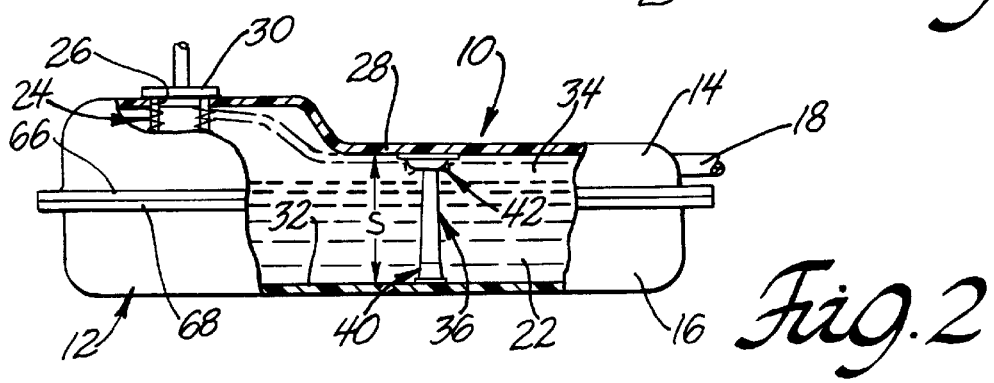
FIG. 2 is a partially broken-away elevational view taken generally along the plane indicated by lines 2—2 in FIG. 1.

Referring to FIGS. 1–2, a plastic fuel tank 10 according to this invention includes a hollow tank body 12 consisting of an upper shell 14 and a lower shell 16. A fill pipe 18 on the tank body has an outboard end 20 through which liquid fuel is dispensed into the fuel tank from a filling station pump nozzle, not shown, to form a pool 22 of liquid fuel in the tank body. A fragmentarily illustrated fuel sender 24 is installed in the tank body 12 through an access port 26 in a top 28 of the upper shell constituting the top of the tank body. The fuel sender includes a cover 30 over the access port and a fuel pump, not shown, thrust against a bottom 32 of the lower shell constituting the bottom of the tank body. The fuel sender pumps liquid fuel from the pool 22 in the tank body to a fuel injection system, not shown, of the motor vehicle.

A vapor dome 34 in the tank body 12 above the pool 22 of liquid fuel contains a gaseous mixture of air and fuel vapor. The tank body experiences vacuum and pressure cycles as the temperature in the vapor dome changes. In a vacuum cycle, atmospheric pressure exceeds the pressure of the gaseous mixture in the vapor dome so that the top 28 of the tank body collapses toward the bottom 32 of the tank body. Conversely, in a pressure cycle, the pressure of the gaseous mixture in the vapor dome exceeds atmospheric pressure so that the top of the tank body expands away from the bottom of the tank body.

Figure 4:
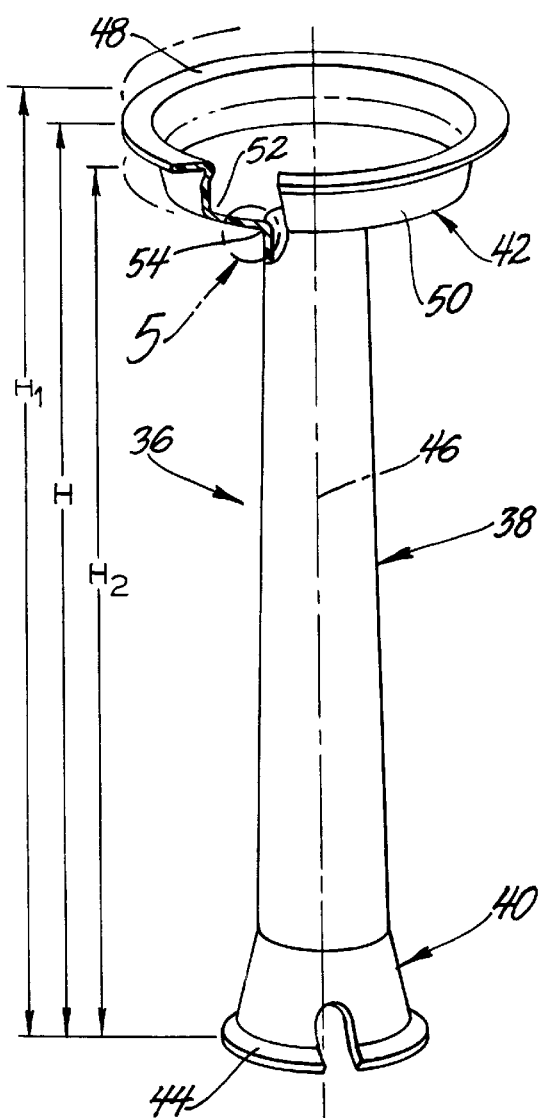
FIG. 4 is a partially broken-away, enlarged perspective view of the strut of the plastic motor vehicle fuel tank according to this invention.
Figure 5:
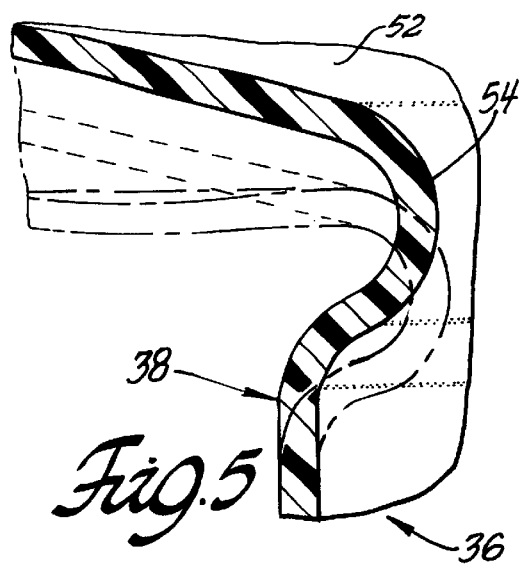
FIG. 5 is an enlarged view of the portion of FIG. 4 identified by reference circle 5 in FIG. 4.

As seen best in FIGS. 2,4 and 5, a vertical plastic strut 36 in the tank body remote from the access port 26 includes a tubular shank 38 having a flared lower base 40 and a cup-shaped upper base 42. The lower base 40 terminates at an annular flange constituting a lower foot 44 of the strut fusion bonded to the bottom 32 of the tank body in a plane perpendicular to a longitudinal centerline 46 of the strut. The upper base 42 terminates at an annular flange constituting an upper foot 48 of the strut fusion bonded to the top 28 of the tank body in a plane perpendicular to the longitudinal centerline 46 of the strut.

The upper base 42 is cupshaped and includes a cylindrical side wall 50 integral with the upper foot 48 and an annular bottom wall 52 integral with the side wall An annular flexible lobe 54 integral with each of the shank 38 and the bottom wall 52 of the upper base constitutes a coupling means supporting the upper foot 48 on the lower foot 44 for back and forth linear translation in the direction of the longitudinal centerline 46 of the strut. The plastic from which the strut 36 is molded is resilient when flexed within its elastic limit. The lobe 54 thus constitutes a spring in the coupling means. In the absence of tension or compression applied to the strut at the upper and lower feet 48,44 thereof, the strut assumes a height "H", FIG. 4.

With the upper and lower feet 48,44 fusion bonded to the top and bottom 28,32 of the tank body 12, the strut 36 expands and collapses with changes in a vertical span "S", FIG. 2, between the top and the bottom of the tank body. In a pressure cycle, the top 28 of the tank body expands away from the bottom 32 of the tank body causing the upper foot 48 to translate linearly away from the lower foot 44 against a restoring force attributable to resilient flexure of the lobe 54. Similarly, in a vacuum cycle, the top of the tank body collapses toward the bottom of the tank body causing the upper foot 48 to translate linearly toward the lower foot 44 against a restoring force attributable to opposite resilient flexure of the lobe 54.

At an expanded height "$H_1$", FIG. 4, of the strut 36 in a pressure cycle, the restoring force of the lobe 54 equals the pressure force on the top 28 of the tank body urging expansion so that the strut becomes effectively rigid in tension and prevents excessive expansion of the top of the tank body relative to the bottom of the tank body. Conversely, at a collapsed height "$H_2$" of the strut in a vacuum cycle, the restoring force of the lobe 54 equals the pressure force on the top of the tank body urging collapse so that the strut becomes effectively rigid in compression and prevents excessive collapse of the top relative to the bottom. The coupling means in the strut 36 thus permits expansion and collapse of the top of the tank body relative to the bottom of the tank body but stops excessive expansion and collapse of the tank body which could compromise the structural integrity of the tank body.

Figure 3:
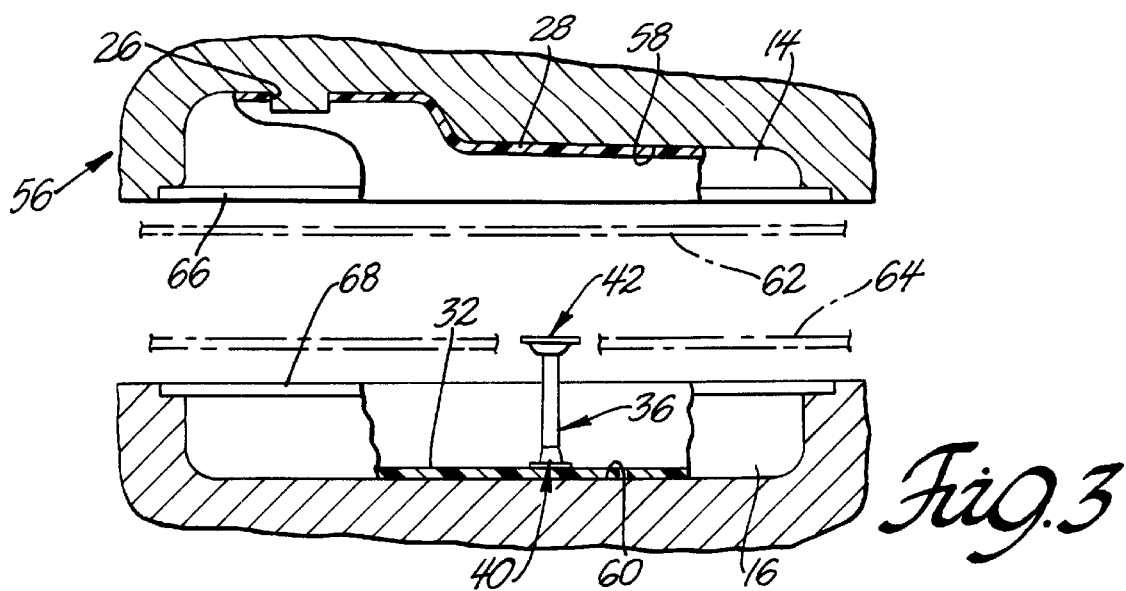
FIG. 3 is similar to FIG. 2 but showing an upper shell, a lower shell, and a plastic strut of the plastic motor vehicle fuel tank according this invention in different relative positions.

The method by which the plastic fuel tank 10 is made is an important feature of this invention and includes forming each of the upper and lower shells 14,16 of the tank body by twin sheet thermoforming process steps. Referring to FIG. 3, a schematically represented twin sheet thermoforming apparatus 56 includes an upper mold cavity 58 shaped like the upper shell 14 and a lower mold cavity 60 shaped like the lower shell 16 which are opened and closed relative to each other. With the mold cavities open, a first flat plastic sheet 62 is located over the upper mold cavity 58 and a second flat plastic sheet 64 is located over the lower mold cavity 60. The first and second plastic sheets 62,64 are heated to a forming temperature at which the plastic sheets are soft and pliable. A vacuum is then drawn in each of the upper and lower mold cavities 58,60 which causes the heated flat plastic sheets to assume the shapes of the upper and lower shells 14,16 including an annular flange 66 around an open end of the upper shell and an annular flange 68 around an open end of the lower shell.

With the upper and lower mold cavities 58,60 still open relative to each other and with the vacuum formed upper and lower shells still at the aforesaid forming temperature, the plastic strut 36 is interposed between the shells, FIG. 3, with the upper and lower feet 48,44 heated to the forming temperature. When the mold cavities are then closed, the annular flanges 66,68 on the upper and the lower shells are squeezed together and fusion bonded to seal closed the interface between the shells and form the hollow tank body 12. At the same time, the upper foot 48 is squeezed against the top 28 of the upper shell and the lower foot 44 is squeezed against the bottom 32 of the lower shell. When the tank body is then permitted to cool and cure, plastic shrinkage collapses the strut linearly and initiates flexure of the lobe 54. The flexure of the lobe 54 is calculated to squeeze the upper and lower feet 48,44 against the top and bottom of the upper and lower shells with sufficient compression to fusion bond the feet to the top and bottom without piercing the top and bottom. Importantly, because the strut is interposed between the upper and lower shells when the mold cavities 58,60 are open, it is located for optimum structural integrity of the tank body independent of the location of the access port 26.

Figure 6:
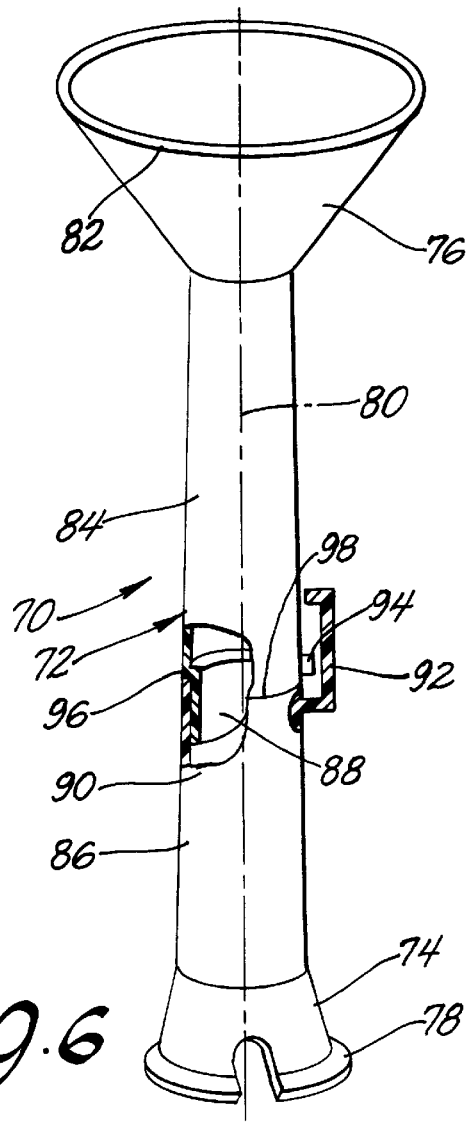
FIG. 6 is a partially broken-away perspective view of the strut of a modified plastic motor vehicle fuel tank according to this invention.

Referring to FIG. 6, a modified plastic fuel tank according to this invention, not shown, is identical to the plastic fuel tank 10 except that the modified tank includes a modified plastic strut 70 instead of the plastic strut 36 described above. The modified plastic strut 70 includes a tubular shank 72 having a flared lower base 74 and a flared upper base 76. The lower base terminates at an annular flange constituting a lower foot 78 of the modified strut fusion bonded to the bottom of the tank body in a plane perpendicular to a longitudinal centerline 80 of the modified strut. The upper base 76 terminates at an annular end constituting an upper foot 82 of the strut fusion bonded to the top of the tank body in a plane perpendicular to the longitudinal centerline 80 of the modified strut.

The shank 72 of the modified strut 70 is divided into a tubular upper shank portion 84 integral with the upper base 76 and a tubular lower shank portion 86 integral with the lower base 74. A reduced diameter cylindrical pilot 88 on the end of the upper shank portion opposite the upper base 76 telescopes into a tubular guide 90 in the end of the lower shank portion opposite the lower base 74 with a mild interference fit which induces friction between the guide and the pilot without foreclosing relative linear translation therebetween The pilot and the guide constitute a coupling means supporting the upper foot 82 on the lower foot 78 for back and forth linear translation in the direction of the longitudinal centerline 80 of the modified strut against a resisting force attributable to friction between the pilot and the guide.

With the upper and lower feet 82,78 of the modified strut fusion bonded to the top and bottom of the tank body, the modified strut expands and collapses with changes in the vertical span between the top and the bottom of the tank body. Linear expansion of the modified strut 70 is limited by a schematically represented cage 92 on the lower shank portion 86 which intercepts a schematically represented pin 94 on the upper shank portion 84. Linear collapse of the modified strut is limited by a shoulder 96 constituting an abutment on the upper shank portion 84 which seats on an end 98 of the lower shank portion 86 constituting an abutment on the lower shank portion. The modified strut thus expands and collapses with the tank body except at the limits defined by the cage and pin 92,94 and by the shoulder 96 and the end 98 of the lower shank portion where the modified strut becomes rigid in expansion and collapse to prevent excessive expansion and collapse of the tank body which could compromise the structural the integrity thereof The modified plastic fuel tank is made by the process described above for the plastic fuel tank 10. With the upper and lower mold cavities open relative to each other and with the vacuum formed upper and lower shells at the aforesaid forming temperature, the modified plastic strut 70 is interposed between the shells with the upper and lower feet 82,78 heated to the forming temperature. When the mold cavities are then closed, the annular flanges on the upper and the lower shells are squeezed together and fusion bonded to seal closed the interface between the shells and form the hollow tank body. At the same time, the upper foot 82 on the modified strut is squeezed against the top of the upper shell and the lower foot 78 is squeezed against the bottom of the lower shell. When the tank body is then permitted to cool and cure, plastic shrinkage collapses the strut linearly against the friction between the pilot 88 and the guide 90 which induces sufficient compression between the upper and lower feet and the top and bottom of the upper and lower shells to fusion bond the feet to the top and bottom of the shells without piercing either. As before, because the modified strut 70 is interposed between the upper and lower shells when the mold cavities are open, it is located for optimum structural integrity of the tank body independent of any access ports in the shells.

Having thus described the invention, what is claimed is:

1. A plastic fuel tank for a motor vehicle comprising:

a hollow plastic tank body having a bottom and a top which expands and collapses relative to the bottom in respective ones of a pressure cycle and a vacuum cycle in the tank body, a plastic strut in the hollow tank body having an upper foot fusion bonded to the top of the tank body and a lower foot fusion bonded to the bottom of the tank body, and a coupling means on the plastic strut operable to support the upper foot on the lower foot for relative linear translation parallel to a longitudinal centerline of the plastic strut in an expansion direction from a height (H) of the strut and in an opposite collapse direction from the height (H) of the strut against a resisting force in each direction and to effectively stop translation of the upper foot relative to the lower foot in the expansion direction at an expanded height ($H_1$) of the strut and in the collapse direction at a collapsed height ($H_2$) of the strut so that the plastic strut resists expansion and collapse of the top of tank body relative to the bottom of the tank body above and below the height (H) of the strut and reinforces the top of tank body against further expansion and further collapse relative to the bottom of the tank body at respective ones of its expanded height ($H_1$) and collapsed height ($H_2$).

2. The plastic fuel tank for a motor vehicle recited in claim 1 wherein the plastic strut comprises:

a tubular plastic shank, a lower plastic base integral with the tubular plastic shank having an annular flange thereon in a plane perpendicular to the longitudinal centerline of the plastic strut constituting the lower foot of the plastic strut, and an upper plastic base integral with the tubular plastic shank having an annular flange thereon in a plane perpendicular to the longitudinal centerline of the plastic strut constituting the upper foot of the plastic strut.

3. The plastic fuel tank for a motor vehicle recited in claim 2 wherein the coupling means comprises:

a resiliently flexible plastic lobe integral with each of the tubular plastic shank and the upper plastic base of the plastic strut.

4. The plastic fuel tank for a motor vehicle recited in claim 1 wherein the plastic strut comprises:

a tubular plastic shank having an upper shank portion and a separate lower shank portion, a lower plastic base integral with the lower shank portion of the tubular plastic shank having an annular flange thereon in a plane perpendicular to the longitudinal centerline of the plastic strut constituting the lower foot of the plastic strut, and an upper plastic base integral with the upper shank portion of the tubular plastic shank having an annular surface thereon in a plane perpendicular to the longitudinal centerline of the plastic strut constituting the upper foot of the plastic strut.

5. The plastic fuel tank for a motor vehicle recited in claim 4 wherein the coupling means comprises:

a cylindrical pilot on an end of a first one of the upper shank portion and the lower shank portion, a tubular guide on an end of a second one of the upper shank portion and the lower shank portion slidably receiving the cylindrical pilot with an interference fit therebetween so that friction between the cylindrical pilot and the guide resists relative linear translation between the upper foot and the lower foot in the expansion direction and in the collapse direction, and a stop means operable to stop sliding movement of the pilot relative to the guide at the expanded height of the plastic strut and at the collapsed height of the plastic strut.

6. The plastic fuel tank for a motor vehicle recited in claim 5 wherein the stop means comprises:

a pin rigidly connected to a first one of the pilot and the guide, a cage rigidly connected to a second one of the pilot and the guide operable to intercept the pin at the expanded height of the plastic strut, a first abutment rigidly connected to the pilot, and a second abutment rigidly connected to the guide operable to intercept the first abutment at the collapsed height of the plastic strut.

* * * * *